(12) United States Patent
Syarif et al.

(10) Patent No.: US 8,931,070 B2
(45) Date of Patent: Jan. 6, 2015

(54) AUTHENTICATION USING THREE-DIMENSIONAL STRUCTURE

(71) Applicant: International Business Machines Corporation, Armonk, NY (US)

(72) Inventors: Ronny Syarif, Singapore (SG); Helen Tandiono, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 13/853,834

(22) Filed: Mar. 29, 2013

(65) Prior Publication Data
US 2014/0298435 A1 Oct. 2, 2014

(51) Int. Cl.
H04L 29/06 (2006.01)
G06F 21/36 (2013.01)

(52) U.S. Cl.
CPC .................................. *G06F 21/36* (2013.01)
USPC ............ 726/7; 726/3; 726/5; 726/22; 726/28; 726/32

(58) Field of Classification Search
None
See application file for complete search history.

(56) References Cited

U.S. PATENT DOCUMENTS

| 2011/0090145 | A1 | 4/2011 | Lu | |
|---|---|---|---|---|
| 2012/0143681 | A1* | 6/2012 | Alcazar et al. | 705/14.49 |
| 2012/0159608 | A1* | 6/2012 | Griffin et al. | 726/16 |
| 2012/0272307 | A1 | 10/2012 | Buer | |
| 2013/0047236 | A1* | 2/2013 | Singh | 726/7 |
| 2013/0305357 | A1* | 11/2013 | Ayyagari et al. | 726/22 |
| 2014/0007225 | A1* | 1/2014 | Gay et al. | 726/19 |
| 2014/0013422 | A1* | 1/2014 | Janus et al. | 726/19 |
| 2014/0040985 | A1* | 2/2014 | Wang | 726/3 |
| 2014/0041020 | A1* | 2/2014 | Zhao et al. | 726/19 |
| 2014/0059673 | A1* | 2/2014 | Azar et al. | 726/19 |
| 2014/0096196 | A1* | 4/2014 | O'Connor et al. | 726/4 |
| 2014/0101740 | A1* | 4/2014 | Li et al. | 726/7 |
| 2014/0109208 | A1* | 4/2014 | Song, Jesse | 726/7 |
| 2014/0123258 | A1* | 5/2014 | Guerrero et al. | 726/7 |
| 2014/0181957 | A1* | 6/2014 | Nguyen et al. | 726/19 |
| 2014/0230046 | A1* | 8/2014 | Dewan et al. | 726/19 |

FOREIGN PATENT DOCUMENTS

| CN | 102594562 A | 7/2012 |
|---|---|---|
| WO | 2011124267 A1 | 10/2011 |

OTHER PUBLICATIONS

RSA SecurID Authentication brochure, RSA Security, Bedford, MA, copyright 2001.

* cited by examiner

*Primary Examiner* — Haresh N Patel
(74) *Attorney, Agent, or Firm* — Damion Josephs

(57) ABSTRACT

A user can be authenticated via traversal of a three-dimensional structure and entry of an authentication code. For example, a user-entered authentication code can be compared to an authentication code, and a user-selected element of the structure can be compared to a destination element resulting from following an authentication path through the structure beginning at a starting element. As another example, a user-selected ordered series of elements of the structure and corresponding user-entered sub-codes can be respectively compared to an authentication ordered series of elements of the structure resulting from following ordered steps of an authentication path through the structure beginning at the starting element and to sub-codes of an authentication code.

15 Claims, 3 Drawing Sheets

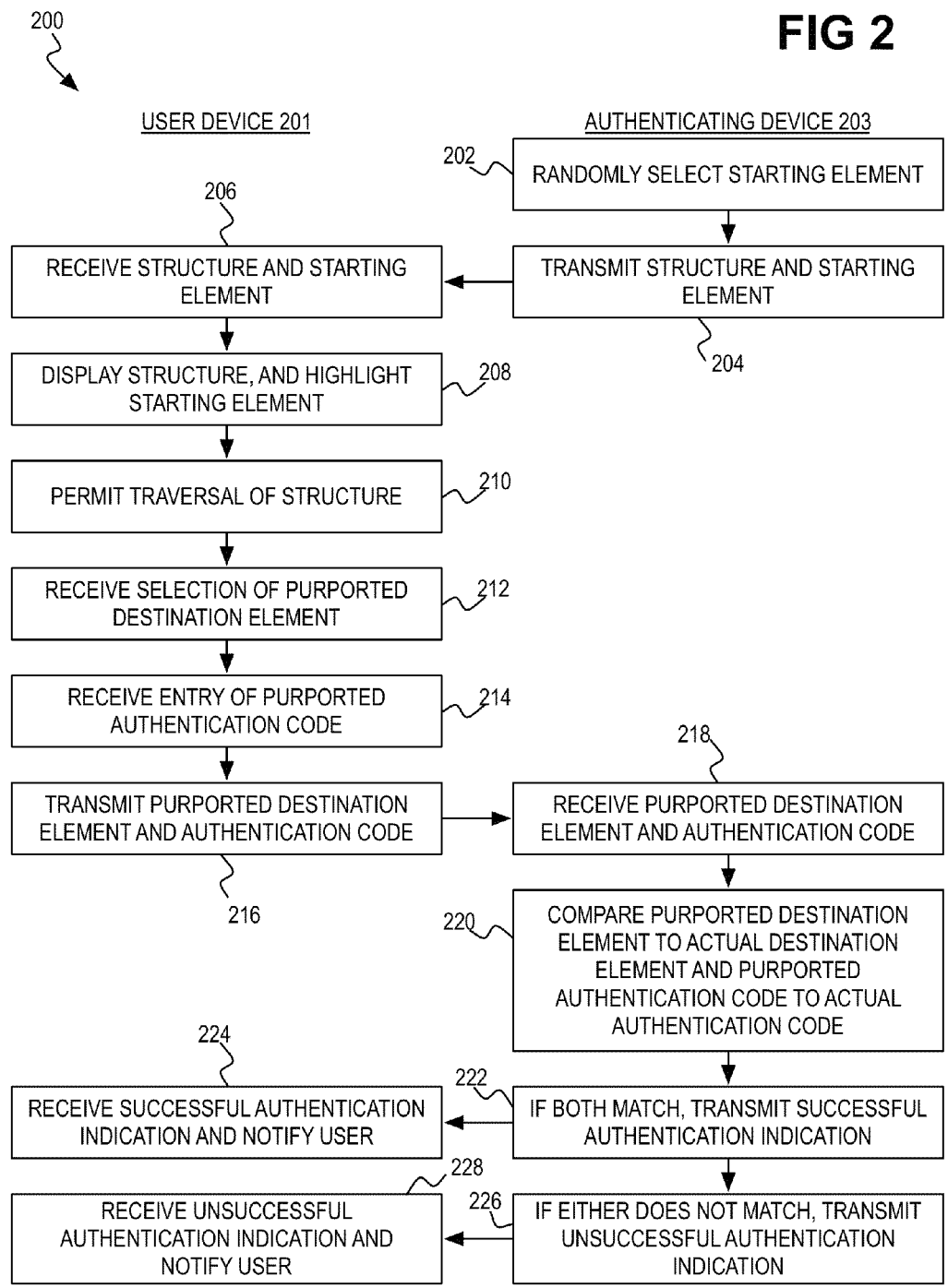

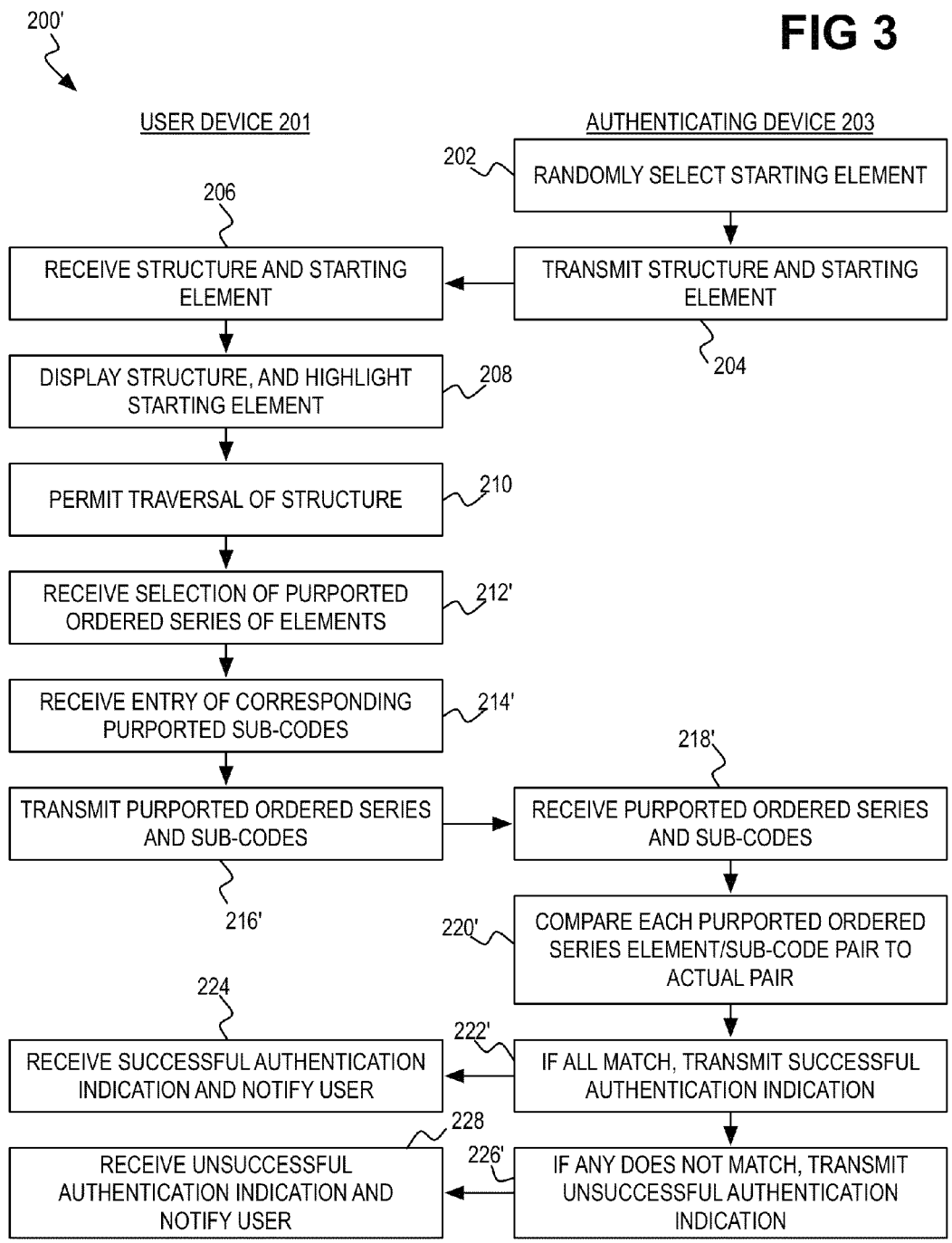

US 8,931,070 B2

AUTHENTICATION USING THREE-DIMENSIONAL STRUCTURE

BACKGROUND

With the advent of networked computing systems, such as those accessible over the Internet, authentication has become an important issue to restrict access to particular data to properly authorized users. For example, for an online banking web site, just an accountholder may be permitted to access financial information of the accountholder. Besides ensuring that others do not have access to a given user's data, authentication should also be robust against hacking attempts by malicious parties attempting to gain access to this data.

SUMMARY

An example method includes receiving, by a computing device, a purported authentication code and at least a purported destination element of a number of elements of a three-dimensional structure. The purported destination element results from following a purported authentication path through the three-dimensional structure beginning at a starting element of the elements. The method includes comparing, by the computing device, the purported authentication code to an actual authentication code and at least the purported destination element to an actual destination element. The actual destination element results from following an actual authentication path through the three-dimensional structure beginning at the starting element. The method includes, in response to determining that both the purported authentication code matches the actual authentication code and at least the purported destination element matches the actual destination element, indicating, by the computing device, successful authentication. The method includes, in response to determining that one or more of the purported authentication code does not match the actual authentication code and at least the purported destination element does not match the actual destination element, indicating, by the computing device, unsuccessful authentication.

A storage device stores computer-executable code executable by a computing device operable by a user to perform another example method. The method includes displaying a three-dimensional structure having a number of elements, including highlighting a starting element of the elements within the three-dimensional structure. The method includes permitting the user to traverse the elements of the three-dimensional structure. The method includes receiving a user-selected element of the elements. The user-selected element is to be compared to a destination element resulting from following an authentication path through the three-dimensional structure beginning at the starting element. The method includes receiving a user-entered authentication code to be compared to authentication code. Authentication of the user is successful upon both the user-selected element matching the destination element and the user-entered authentication code matching the authentication code.

A storage device stores computer-executable code executable by a computing device operable by a user to perform still another example method. The method includes displaying a three-dimensional structure having a number of elements, including highlighting a starting element of the elements within the three-dimensional structure. The method includes permitting the user to traverse the elements of the three-dimensional structure. The method includes receiving each element of a user-selected ordered series of at least some of the elements of the three-dimensional structure. The method includes, for each element of the user-selected ordered series, receiving a corresponding user-entered sub-code therefor. An authentication ordered series of at least some of elements of the three-dimensional structure results from following a number of ordered steps of an authentication path through the three-dimensional structure beginning at the starting element. An authentication code includes a number of sub-codes. Authentication of the user is successful upon each element of the user-selected ordered series and the corresponding user-entered sub-code therefor respectively matching a corresponding element of the authentication ordered series and a corresponding sub-code of the authentication code.

BRIEF DESCRIPTION OF THE SEVERAL VIEWS OF THE DRAWINGS

The drawings referenced herein form a part of the specification. Features shown in the drawing illustrate only some embodiments of the disclosure, and not of all embodiments of the disclosure, unless the detailed description explicitly indicates otherwise, and readers of the specification should not make implications to the contrary.

FIG. 2 is a flowchart of an example method that can be performed in accordance with a first type of authentication in relation to the structure of FIG. 1.

FIG. 3 is a flowchart of an example method that can be performed in accordance with a second type of authentication in relation to the structure of FIG. 1.

DETAILED DESCRIPTION

The following detailed description of exemplary embodiments of the disclosure refers to the accompanying drawings that form a part of the description. The drawings illustrate specific exemplary embodiments in which the disclosure may be practiced. The detailed description, including the drawings, describes these embodiments in sufficient detail to enable those skilled in the art to practice the disclosure. Those skilled in the art may further utilize other embodiments of the disclosure, and make logical, mechanical, and other changes without departing from the spirit or scope of the disclosure.

As noted in the background section, authentication should restrict access to particular data to properly authorized users, and further should be robust against hacking attempts by malicious users who are attempting to gain access to data in an unauthorized manner. Such hacking attempts have become increasingly more sophisticated. For instance, so-called "man-in-the-middle" attacks may capture user input during the authentication process, and then use this user input to gain access to the same data. A user entering a password on a web site, for example, may have such text or other user input surreptitiously captured and reentered by a malicious party to gain access without the user's knowledge or consent.

Disclosed herein are techniques that provide for more robust authentication and that provide further protection against man-in-the-middle and other types of hacking attacks. In general, a user is authenticated via traversal of a three-dimensional structure and entry of an authentication code. For example, a user-entered authentication code can be compared to an authentication code, and a user-selected element of the structure can be compared to a destination element resulting from following an authentication path through the structure beginning at a starting element. As another example, a user-selected ordered series of elements of the structure and corresponding user-entered sub-codes can be respectively compared to an authentication ordered series of elements of the structure resulting from following ordered steps of an authentication path through the structure beginning at the starting element and to sub-codes of an authentication code.

Figure 1:
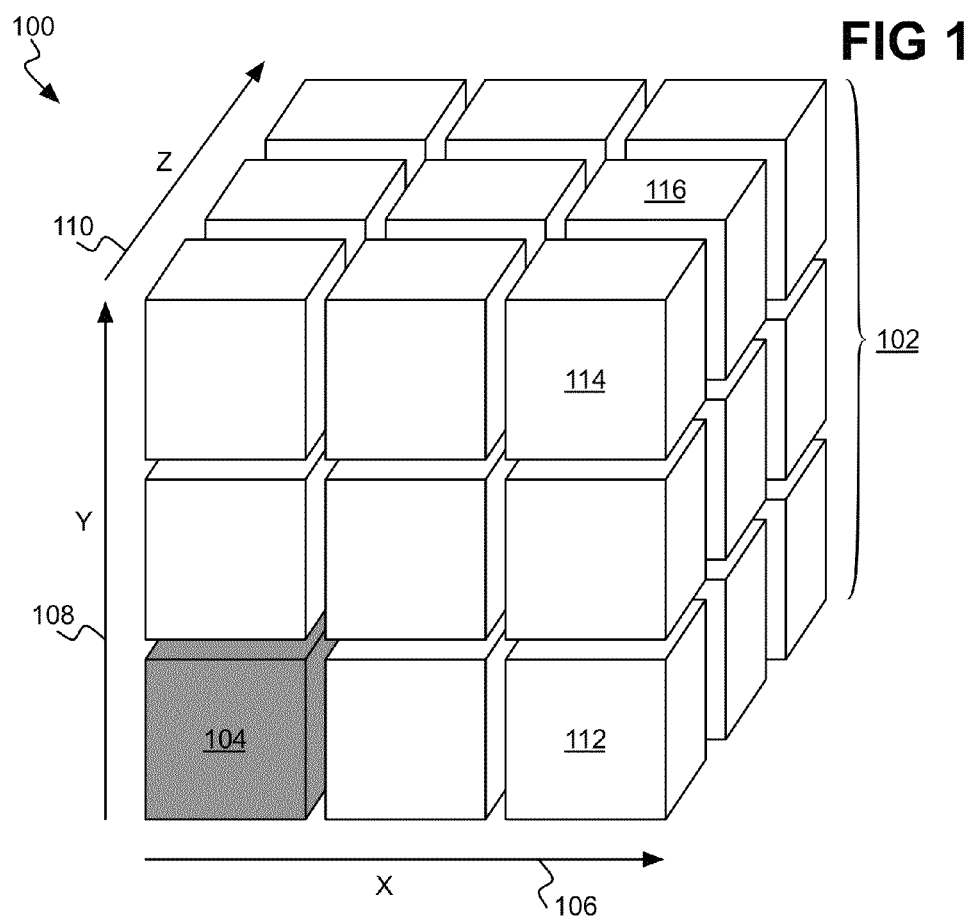
FIG. 1 is a diagram of an example three-dimensional structure in accordance with which authentication can be performed.

FIG. 1 shows an example three-dimensional structure 100 that can be used in authentication. The structure 100 is specifically a cube, which is a type of a cuboid. A cuboid is a three-dimensional structure composed of three pairs of rectangular faces opposite one another and joined at right angles to each other, and is also known as a rectangular parallelepiped, a right prism, or more colloquially, a rectangular "box." Other types of three-dimensional structures can also be employed for authentication.

The three-dimensional structure 100 includes multiple elements 102, which as depicted in FIG. 1 can be cubes. A starting element 104 is highlighted in FIG. 1, such as via shading, color, or in another manner. The starting element 104 is generally randomly determined among all the elements 102 of the structure 100. For reference, FIG. 1 shows three axes or directions: an x direction or axis 106, a y direction or axis 108, and a z direction or axis 110.

In a first type of authentication process disclosed herein, authentication of a user is successful where the user has selected the correct element 102 which results from following a correct authentication path among the elements 102 from the starting element 104, and where the user has entered the correct authentication code. If the user selects the wrong element 102 or has entered the wrong authentication code, then authentication is unsuccessful. Because the starting element 104 is randomly chosen, the correct element 102 will differ for each such starting element 104 even when the authentication path remains the same.

The authentication path is specified by an ordered series of steps through the three-dimensional structure 100, can be said to correspond to a tuple of x, y, and z coordinates, and can be specified by the user in advance. As an example, consider the authentication path by the tuple (2, 2, 1). Starting at the randomly determined starting element 104, following the first ordered step of 2 in the x direction 106 results in reaching, arriving at, or landing on the element 112. This is because the element 112 is the second element from the starting element 104 in the x direction 106.

From the element 112, following the second ordered step of 2 in the y direction 108 results in reaching the element 114, because the element 114 is the second element from the element 112 in the y direction 108. From the element 114, following the third ordered step of 1 in the z direction 110 results in reaching the element 116, because the element 116 is the first element from the element 114 in the z direction 110. The element 114 is thus the destination element for this authentication path when the starting element is the element 104.

The authentication code can be a user-specified authentication code, like a password. The authentication code can also be a temporally variable authentication code that periodically changes over time automatically without user specification (i.e., input). For example, such an authentication code can be provided by employing a hardware or software token that is assigned to a user and that changes at fixed intervals based on a clock value and a random key or seed. Such tokens are available from RSA, the Security Division of EMC, from NagraID Security, and from other vendors.

Therefore, in accordance with the first type of authentication process disclosed herein, a user is presented with a display of the three-dimensional structure 100, where a randomly determined starting element of the elements 102 is highlighted. The user knows the correct authentication path ahead of time, and knows or has access to the correct authentication code. The user is permitted to traverse the structure 100 to select the destination element that is reached by following the authentication path from the starting element highlight. For instance, the user may be permitted to rotate the structure 100, move "inside" the structure 100 to reveal elements 102 that are hidden in the interior thereof from an external view of the structure 100, move planes of elements 102 of the structure to reveal such hidden elements 102, and so on.

The user therefore selects one of the elements 102 as a destination element, and also enters the authentication code. The authentication code entered by the user, which is referred to as the purported authentication code, is compared to the correct or actual authentication code. The destination element selected by the user is referred to as the purported destination element, and results from the user following what he or she believes is the correct authentication path from the starting element, where this path is also referred to as the purported authentication path. The selected destination element is compared to the correct or actual destination element that results when traversing the three-dimensional structure 100 from the current starting element in accordance with the correct or actual authentication path. If both these matches are successful, then authentication is successful; if either is unsuccessful, then authentication is unsuccessful.

The authentication path can have for any of its ordered steps (i.e., for any of the tuple of coordinates) a value that is equal to or that exceeds the number of elements 102 within the three-dimensional structure 100 along the corresponding direction, in which case the ordered step in question results in wrapping back around the structure 100. For example, in FIG. 1, an ordered step of 1 as the first step in the authentication path selects the element 102 immediately to the right and adjacent to the starting element 104, whereas an ordered step of 2 as the first step selects the element 112 two elements to the right of the starting element 104. An ordered step of 3 as the first step in the authentication path wraps around the structure 100 back to the starting element 104, and thus selects the starting element 104. An ordered step of 4 as the first step again selects the element 102 immediately to the right of the starting element 104, an ordered step of 5 as the first step selects the element 112, and so on.

In a second type of authentication process disclosed herein and that is a variation on the first type of authentication process that has been described, authentication of a user is successful where the user has selected a correct ordered series of elements 102 and where the user has entered correct sub-codes in correspondence with these elements 102. If the user selects the wrong ordered series of element 102 or has entered incorrect corresponding sub-codes, then authentication is unsuccessful. As with the first type of authentication process, because the starting element 104 is randomly selected, the correct ordered series of elements 102 will differ for each starting element 104.

The ordered series includes the elements 102 that are traversed within the three-dimensional structure as the ordered series of steps of the authentication path is followed. In the example described above where the authentication path is specified by the tuple (2, 2, 1), for instance, the ordered series includes the elements 112, 114, and 116, in that order. This is because the element 112 is reached by following the first ordered step of 2, the element 114 is then reached by following the second ordered step of 2, and the destination element 116 is finally reached by following the last ordered step of 3. Thus, whereas the first type of authentication process just ensures that the destination element 116 has been selected correctly, the second type of authentication process ensures that the elements 112, 114, and 116 that are reached while following the authentication path are selected correctly and in the correct order.

The authentication code has sub-codes that can be equal in number to the number of ordered steps of the authentication path. At the element 102 of the three-dimensional structure 100 that is reached upon following each ordered step, the user can enter a corresponding sub-code of the authentication code. The result is an ordered series of pairs of elements 102 selected by the user and sub-codes entered by the user. For example, the authentication code may be specified by the series of sub-codes A, B, and C. For the authentication path specified by the tuple (2, 2, 1), the user enters the sub-code A after reaching the element 112 upon following the first ordered step of 2; the sub-code B after reaching the element 114 upon following the second ordered step of 2; and the sub-code C after reaching the element 116 upon following the third ordered step of 1.

As in the first type of authentication process, a user is presented with a display of the three-dimensional structure 100 in accordance with the second type of authentication process as well, where a randomly selected starting element of the elements 102 is highlighted. The user knows the correct authentication path ahead of time, and knows or has access to the correct authentication code. The user traverses the structure 100 to select elements 102 in accordance with the ordered steps of the authentication path. At each selected element 102, the user enters a corresponding sub-code of the authentication code. This process is followed until all the ordered steps of the authentication path have been followed, at which point the user has entered all the corresponding sub-codes of the authentication code.

The ordered series of elements 102 selected by the user thus results from the user following what are referred to as the purported ordered steps of the purported authentication path. The sub-codes entered by the user in correspondence with these elements 102 are referred to as the purported sub-codes of the purported authentication code. For successful authentication, two matches have to be successful. First, the purported ordered series of elements 102 has to match what are referred to as the correct or actual series of elements 102 that are traversed when following what are referred to as the correct or actual ordered steps of the actual authentication path starting at the current starting element. Second, the purported sub-codes of the purported authentication code have to match what are referred to as the correct or actual sub-codes of the actual authentication code.

Stated another way, the purported ordered series of elements 102 together with the purported sub-codes make up an ordered series of purported element/sub-code pairs. Each purported element/sub-code pair includes a user-selected element 102 and a user-entered sub-code that the user entered at this element 102. The actual ordered series of elements 102 together with the actual sub-codes similarly make up an ordered series of correct or actual element/sub-code pairs. Each purported element/sub-code pair has to match a corresponding actual element/sub-code pair, in order, for successful authentication. If any purported pair does not match its corresponding actual pair in the ordered series, then authentication is unsuccessful.

FIG. 2 shows an example method 200 of the first type of authentication process that has been described. Parts of the method 200 in the left-hand column are performed by a user device 201, whereas parts of the method 200 in the right-hand column are performed by an authenticating device 203. The user device 201 is a device that a user who wishes to be authenticated operates. The authenticating device 203 may be a part of a system like one that includes a server, and is the device that authenticates the user to provide access, for instance, to data stored on the system. The method 200 is performed responsive to a request by the user at the user device 201 to be authenticated, such as part of a logon process, for instance.

The authenticating device 203 randomly selects a starting element of the elements 102 of the three-dimensional structure 100 (202). The structure 100 and an identity of which element 102 has been randomly selected as the starting element are sent to the user device 201 (204), which receives this information (206). In response, the user device 201 displays the structure 100 on a display thereof, and highlights the starting element that the authenticating device 203 has selected (206). It is noted that each time the method 200 is performed, the authenticating device 203 can select a different starting element of the structure 100. The structure 100 itself may remain the same, or may change as well.

The user device 201 permits the user to traverse the three-dimensional structure 100 (210), as has been described. The user thus controls an input device, like a keyboard, a pointing device such as a mouse or touchpad, a touch screen, or another type of input device to traverse the structure 100. As the user traverses the structure 100 in this way, the display of the structure 100 correspondingly is updated.

The user device 201 receives from the user selection of an element 102 of the three-dimensional structure 100 that the user believes is the destination element that is correctly reached by following the authentication path from the highlighted starting element (212). For instance, once the user traverses the structure 100, the user may click or tap on one of the elements 102 to signify selection of this purported destination element. The user device 201 also receives entry of the authentication code that the user believes is correct (214), which is the purported authentication code, and which may be received via text entry or in another manner, depending on the type of code in question. The user device 201 sends the purported destination element selected by the user and the purported authentication code entered by the user to the authenticating device 203 (216), which receives this information (218).

The authenticating device 203 compares the purported destination element to the actual, correct destination element that is reached by following the actual authentication path from the previously selected starting element, and also compares the purported authentication code to the actual authentication code (220). If both match, then the authenticating device 203 sends indication to the user device 201 that authentication has been successful (222), and the user device 201 receives this information and accordingly can notify the user (224), by indicating, for instance, this information to the user on the display or in another way. If either the purported destination element does not match the actual destination element or the purported authentication code does not match the actual authentication code, however, then the authenticating device 203 sends indication to the user device 201 that authentication has failed (226), and the user device 201 receives this information and likewise can accordingly notify the user (228).

FIG. 3 shows an example method 200' of the second type of authentication process that has been described. Like-numbered parts between FIGS. 2 and 3 are performed in the same way in the method 200' as they have been described for the method 200. Prime-numbered versions in FIG. 3 of the parts of FIG. 2 are performed in a similar but not completely the same way in the method 200' as they have been described for the method 200.

The authenticating device 203 randomly selects a starting element of the elements 102 of the three-dimensional structure 100 (202). The authenticating device 203 transmits the structure 100 and this starting element to the user device 201 (204), which receives this information. The user device 201 responsively displays the structure 100, including highlighting the starting element that has been identified (208), and permits the user operating the device 201 to traverse the structure 100 (210).

As the user follows each ordered step of the purported authentication path, the user device 201 receives from the user selection of the element 102 reached by each such step (212'). Stated another way, the user device 201 receives from the user selection of the purported ordered series of elements 102 corresponding to the authentication path. Likewise, as the user follows each ordered step of the purported authentication path, the user device 201 receives from the user entry of a corresponding purported sub-code (214'). Again, stated another way, the user device 201 receives entry of the corresponding purported sub-codes, resulting in an ordered purported series of elements and corresponding sub-codes that the user believes to be correct.

The user device 201 transmits the purported ordered series of elements 102 and the purported sub-codes to the authenticating device 203 (216'), which receives this information (218'). As has been described, the authenticating device 203 compares each ordered series purported element/purported sub-code pair to the corresponding actual element/actual sub-code pair for the starting element previously randomly selected (220'). If every purported such pair matches its corresponding actual pair, then authentication is successful, and the authenticating device 203 transmits indication of successful authentication to the user device 201 (222'), which receives this indication and can notify the user (224). If any purported pair, however, does not match its corresponding actual pair, then authentication is unsuccessful, and the authenticating device 203 transmits indication of failed authentication to the user device 201 (226'), which receives this indication and can similarly notify the user (228).

Figure 4:
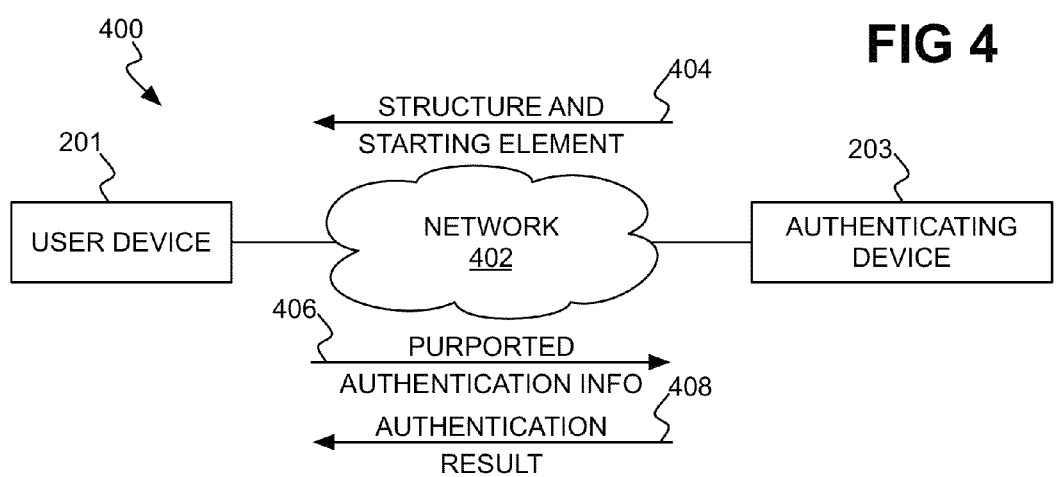
FIG. 4 is a diagram of a system in which authentication can be performed in relation to the method of FIG. 2 or FIG. 3 in relation to the structure of FIG. 1.

FIG. 4 shows an example system 400 in which either type of authentication process that has been described can be performed. The system 400 includes the user device 201 and the authenticating device 203, which communicate with one another via a network 402. The user device 201 may be a computing device like a tablet, a smartphone, a personal-digital assistant (PDA) device, a laptop or notebook computer, a desktop computer, or another type of computing device. The authenticating device 203 may be a server computing device that is part of a system, or another type of computing device. The network 402 may be or include a local-area network (LAN), a wide-area network (WAN), a telephony network, the Internet, an intranet, and/or an extranet, among other types of networks.

As represented by the arrow 404, the authenticating device 203 sends to the user device 201 the three-dimensional structure 100 and identification of the randomly selected starting element therein. As represented by the arrow 406, the user device 201 ultimately sends back to the authenticating device 203 purported authentication information, including at least the purported destination element and the purported authentication code. As represented by the arrow 408, the authentication device then sends to the user device 201 whether the user has been successfully authentication or not based on this purported authentication information.

It is noted that, as can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A method comprising:
receiving, by a computing device, a purported authentication code and at least a purported destination element of a plurality of elements of a three-dimensional structure, the purported destination element resulting from following a purported authentication path through the three-dimensional structure beginning at a starting element of the elements;
comparing, by the computing device, the purported authentication code to an actual authentication code and at least the purported destination element to an actual destination element, the actual destination element resulting from following an actual authentication path through the three-dimensional structure beginning at the starting element;
in response to determining that both the purported authentication code matches the actual authentication code and at least the purported destination element matches the actual destination element, indicating, by the computing device, successful authentication; and
in response to determining that one or more of the purported authentication code does not match the actual authentication code and at least the purported destination element does not match the actual destination element, indicating, by the computing device, unsuccessful authentication.

2. The method of claim 1, wherein receiving at least the purported destination element comprises receiving, of the elements of the three-dimensional structure, just the purported destination element,
and wherein comparing at least the purported destination element comprises comprising, of the elements of the three-dimensional structure, just the purported destination element.

3. The method of claim 1, wherein the purported authentication code comprises a plurality of purported sub-codes, the purported authentication path comprises a plurality of purported ordered steps through the three-dimensional structure beginning at the starting element, and receiving the purported authentication code and at least the purported destination element comprises:
receiving, for each purported ordered step performed, as a given step, a purported element/sub-code pair comprising a corresponding element of the elements that results from following the given step as part of the purported authentication path through the three-dimensional structure and a corresponding sub-code of the purported sub-codes entered at the corresponding element.

4. The method of claim 3, wherein the actual authentication code comprises a plurality of actual sub-codes, the actual authentication path comprises a plurality of actual ordered steps through the three-dimensional structure beginning at the starting element, and comparing the purported authentication code to the actual authentication code and at least the purported destination element to an actual destination element comprises:
comparing the purported element/sub-code pair for each purported ordered step performed to a corresponding actual element/sub-code pair therefor, the corresponding actual element/sub-code pair comprising a given element of the elements that results from following a corresponding actual ordered step of the actual ordered steps as part of the actual authentication path through the three-dimensional structure and a corresponding actual sub-code of the actual sub-codes to be entered at the given element.

5. The method of claim 4, wherein determining that both the purported authentication code matches the actual authentication code and at least the purported destination element matches the actual destination element comprises determining that the purported element/sub-code pair for each purported ordered step matches the corresponding actual element/sub-code pair therefor, and wherein determining that one or more of the purported authentication code does not match the actual authentication code and at least the purported destination element does not match the actual destination element comprises determining that the purported element/sub-code pair for any purported ordered step does not match the corresponding actual element/sub-code pair therefor.

6. The method of claim 1, further comprising:
randomly selecting, by the computing device, the starting element prior to receiving the purported authentication code and at least the purported destination element.

7. The method of claim 1, wherein the actual authentication code comprises a user-specified authentication code.

8. The method of claim 1, wherein the actual authentication code comprises a temporally variable authentication code that periodically changes over time automatically without user specification.

9. The method of claim 1, wherein the actual authentication path comprises a user-specified authentication path through the three-dimensional structure.

10. The method of claim 1, wherein the three-dimensional structure comprises a cuboid.

11. A storage device storing computer-executable code that when executed by a computing device causes a method to be performed, the method comprising:
displaying a three-dimensional structure having a plurality of elements, including highlighting a starting element of the elements within the three-dimensional structure;
permitting the user to traverse the elements of the three-dimensional structure;
receiving each element of a user-selected ordered series of at least some of the elements of the three-dimensional structure; and
for each element of the user-selected ordered series, receiving a corresponding user-entered sub-code therefor, wherein an authentication ordered series of at least some of elements of the three-dimensional structure results from following a plurality of ordered steps of an authentication path through the three-dimensional structure beginning at the starting element, and an authentication code comprises a plurality of sub-codes, and wherein authentication of the user is successful upon each element of the user-selected ordered series and the corresponding user-entered sub-code therefor respectively matching a corresponding element of the authentication ordered series and a corresponding sub-code of the authentication code.

12. The storage device of claim 11, wherein the method further comprises:
transmitting, to a remote computing device, the user-selected ordered series and the corresponding user-entered sub-code for each element of the user-selected ordered series, the remote computing device to respectively compare each element of the user-selected ordered series and the corresponding user-entered sub-code therefor to the corresponding element of the authentication ordered series and the corresponding sub-code of the authentication code;
receiving, from the remote computing device, an authentication result corresponding to whether each element of the user-selected ordered series and the corresponding user-entered sub-code therefor respectively matches the corresponding element of the authentication ordered series and the corresponding sub-code of the authentication code; and
indicating the authentication result to the user.

13. The storage device of claim 12, wherein the method further comprises:
receiving, from the remote computing device, the starting element prior to highlighting the starting element within the three-dimensional structure.

14. The storage device of claim 11, wherein the authentication code comprises a temporally variable authentication code that periodically changes over time automatically without user specification,
and wherein the authentication path comprises a user-specified authentication path through the three-dimensional structure.

15. The storage device of claim 11, wherein the three-dimensional structure comprises a cuboid.

* * * * *